Nov. 25, 1969
R. E. SMITH
3,480,520
METHOD FOR SODIUM CONCENTRATION SENSING
Filed Nov. 17, 1966
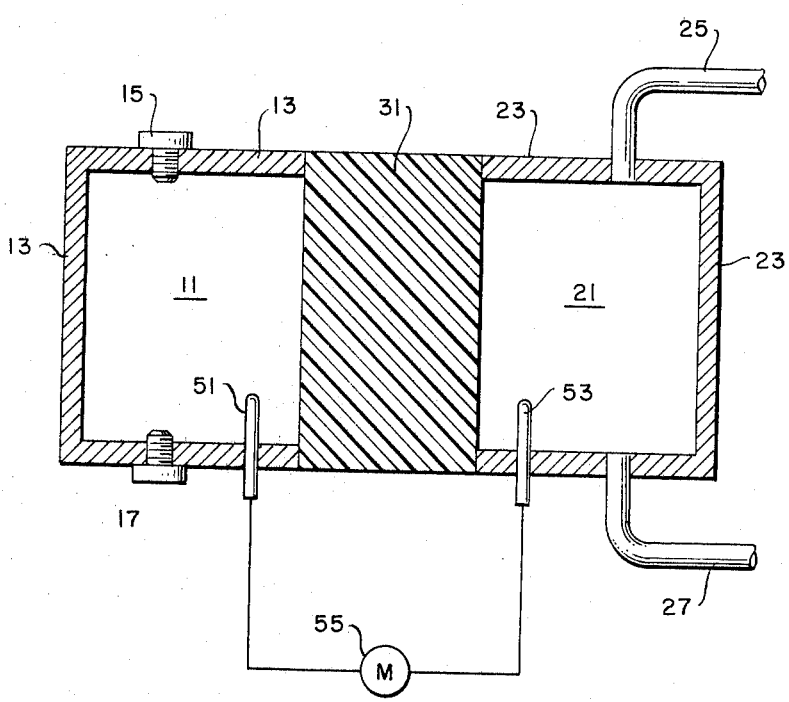
INVENTOR.
ROBERT E. SMITH
BY
ATTYS.

3,480,520
METHOD FOR SODIUM CONCENTRATION SENSING
Robert Eugene Smith, Annapolis, Md., assignor to the United States of America as represented by the Secretary of the Navy
Filed Nov. 17, 1966, Ser. No. 595,274
Int. Cl. B01k 3/00
U.S. Cl. 204—1                2 Claims

---

ABSTRACT OF THE DISCLOSURE

A method for continuous sensing of a concentration of an amalgam to determine the amount of alkali or base metal dissolved in the mercury.

---

The invention described herein may be manufactured and used by or for the Government of the United States of America for governmental purposes without the payment of any royalties thereon or therefor.

The present disclosure relates to an amalgam concentration detector and more particularly to a method for testing an amalgam to determine the amount of metal dissolved in the mercury.

The prior art systems for determining the amount of an alkalic or base metal dissolved in mercury has generally been by a wet chemical analysis. This procedure requires considerable time to perform and because of this factor, it is rendered useless in systems of rapidly changing concentrations such as those used in fuel cells. In these systems of rapid concentration change, it is necessary to have some means of determining the concentration at any instant.

The present invention eliminates the defects present in the prior art devices by providing a non-aqueous method for continuously sensing the concentration of alkalic or base metal dissolved in mercury. The present inventive method utilizes a device having a chamber divided by a cation exchange resin partition into a first chamber containing an alkali metal amalgam having a known concentration of the alkali metal dissolved in mercury and a second chamber containing the unknown concentration of the same alkali metal dissolved in mercury.

An object of the present invention is to provide a continuous method of testing an alkali metal amalgam for the amount of alkali metal dissolved in the mercury.

Another object of the invention is to provide a non-aqueous method of testing an alkali metal amalgam for the amount of alkali metal dissolved in the mercury.

Other objects and many of the attendant advantages of this invention will be readily appreciated as the same becomes better understood by reference to the following detailed description when considered in connection with the accompanying drawings wherein:

Referring to the sole figure of the drawing there is provided a first chamber 11 having walls 13 made of a suitable material such as polymethacrylate, methyl methacrylate, polytetrafluoroethylene, mild steel, black iron, nickel, or other material non-reactive with the alkali metal amalgam to be tested. The wall 13 is provided with a first plug 15 and a second plug 17 for providing access to the contents of chamber 11.

A second chamber 21 is provided having walls 23. The second chamber is provided with an inlet pipe 25 and an outlet pipe 27 which are manufactured from the same group of materials as is the wall 23. The chamber 11 is separated from the chamber 21 by a suitable cation exchange resin 31. The cation exchange resin may be from one mil to one inch thick. The experimental embodiment of the invention utilized a thirty-five thousandths of an inch thick sheet of a sulfinated polystyrene plastic cation exchange resin known as CR-61 Nepton Cation manufactured by Ionics, 152 Sixth St., Cambridge, Mass. Another suitable cation exchange resin is AMFion Cation 60.

A first electrode 51 is partially in the chamber 11 and pierces wall 13. A second electrode 53 is partially in the chamber 21 and pierces the wall 23. The electrodes 51 and 53 may be made of a mild steel, platinum, stainless steel, black iron, nickel or other suitable material which is both conductive and non-reactive with the alkali metal amalgam to be tested. A millivolt meter 55 has one of its inputs connected to the electrode 51 and its other input connected to electrode 53. The millivolt meter 55 may be of the type which prints out a permanent record of voltage vs. time. By way of example, if the unit is to be utilized for detecting sodium amalgams then the cation exchange resin is equilibrated in 30% NaOH solution and allowed to dry. The dry treated cation exchange resin is sandwiched between the two chambers to form the testing cell. The standard chamber 11 contains a known sodium amalgam which has been accurately determined by chemical analysis. The unknown sodium amalgam is fed through the chamber 21 by pipes 25 and 27. The output voltage is read in millivolts on meter 55 and is related to the concentration of dissolved sodium in the unknown amalgam.

Specifically, the model built in the laboratory utilized at room temperature a known standard of 0.1% sodium amalgam in chamber 11 and from 0.1% to 0.5% sodium amalgam in chamber 21 a zero to fifty millivolt output was measured by meter 55. It is to be noted that the graph of the cell output versus the log of the concentration of sodium on the system side (chamber 21) is linear in the range of concentration of 0.1 to 0.5 percent.

The following table is an example of the results obtained at 3 points,

| Amalgam concentration, percent sodium by weight | Actual cell output, millivolts | Calculated theoretical output |
|---|---|---|
| 0.361 | 38.5 | 38.1 |
| 0.315 | 29 | 34.6 |
| 0.250 | 22 | 28.8 |

It is to be noted that a 5% sodium by weight amalgam concentration may be utilized in the chamber 11 for a standard. For this condition the meter 55 would read zero for a 0.5% sodium by weight amalgam concentration in chamber 21 and 50 millivolts for 0.1% sodium by weight amalgam concentration in chamber 21. The cell may be used to measure the amalgam concentration of other alkali metals such as lithium, potassium, and cesium. The model built in the laboratory was not affected by changes in pressure on the amalgam. However, it has been found that changes in temperature will affect the operation and calibration of the cell.

Obviously many modifications and variations of the present invention are possible in the light of the above teachings. It is therefore to be understood that within the scope of the appended claims the invention may be practiced otherwise than as specifically described.

What is claimed is:

1. A method of determining the concentration of an alklai metal in an amalgam without the use of an aqueous solution comprising the steps of:

separating a first alkali metal amalgam having a known concentration of said alkali metal from a second alkali metal amalgam having an unknown concentration of the same alkali metal as the said first amalgam by a cation exchange resin; and measuring the electric potential between said first and said second amalgams, said electric potential being related to said unknown concentration of said alkali metal in said second alkali metal amalgam whereby the unknown alkali metal concentration in said second alkali metal amalgam may be ascertained.

2. A method of determining the concentration of an alkali metal amalgam as defined in claim 1 wherein an alkali metal is selected from the group consisting of sodium, potassium, cesium and lithium.

References Cited

UNITED STATES PATENTS

| 2,614,976 | 10/1952 | Patnode et al. | 204—195.1 |
| 2,728,656 | 12/1955 | Neher | 204—195 |
| 3,281,348 | 10/1966 | Schumacher et al. | 204—1.1 |
| 3,324,013 | 6/1967 | Dewing | 204—195.1 |

JOHN H. MACK, Primary Examiner

T. H. TUNG, Assistant Examiner

U.S. Cl. X.R.

204—195